(12) United States Patent
Tachibana (10) Patent No.: US 6,491,401 B2
(45) Date of Patent: Dec. 10, 2002

(54) PROJECTION TYPE PICTURE DISPLAY APPARATUS

(75) Inventor: Toshitaka Tachibana, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/794,360

(22) Filed: Feb. 28, 2001

(65) Prior Publication Data

US 2002/0001067 A1 Jan. 3, 2002

(30) Foreign Application Priority Data

May 31, 2000 (JP) ........................................ 2000-163661

(51) Int. Cl.[7] .............................................. G03B 21/14
(52) U.S. Cl. ........................................ 353/101; 396/428
(58) Field of Search .............................. 396/428, 437; 353/101, 74, 119

(56) References Cited

U.S. PATENT DOCUMENTS

| | | | | | |
|---|---|---|---|---|---|
| 3,128,982 A | * | 4/1964 | Cristopher | ................ | 248/183.1 |
| 3,152,527 A | * | 10/1964 | Watson | ........................ | 352/243 |
| 6,027,085 A | * | 2/2000 | Ruther | .................... | 248/187.1 |
| 6,059,413 A | * | 5/2000 | Okubo | ........................ | 353/119 |
| 6,106,120 A | * | 8/2000 | Menard | ........................ | 349/58 |

FOREIGN PATENT DOCUMENTS

| | | |
|---|---|---|
| JP | A832907 | 2/1996 |
| JP | A8271978 | 10/1996 |
| JP | A11249234 | 9/1999 |

\* cited by examiner

Primary Examiner—Russell Adams
Assistant Examiner—D. Ben Esplin
(74) Attorney, Agent, or Firm—Birch, Stewart, Kolasch & Birch, LLP (57) ABSTRACT

In a projection type picture display apparatus, three degrees of freedom out of six degrees of freedom which are adjusted by an angle-of-view adjusting mechanism are adjusted by using one adjusting plate (three-axis adjusting plate). The adjusting plate on which a projection unit is fixedly supported rotates the projection unit around the X-axis or Z-axis with respect to a screen disposed in parallel to the XY plane and translates the projection unit in the Y-axis direction to adjust three degrees of freedom. The adjusting plate has first, second and third support shafts extending in the Y-axis direction, a first adjusting shaft engageable with the first and second support shafts, and a second adjusting shaft engageable with the first and third support shafts, and adjusts the three degrees of freedom of the projection unit on the basis of the combination of the engagements.

8 Claims, 7 Drawing Sheets

PRIOR ART

Fig. 8

PRIOR ART

Fig. 9

PRIOR ART

Fig. 10

PRIOR ART

Fig. 11

PRIOR ART

PROJECTION TYPE PICTURE DISPLAY APPARATUS

BACKGROUND OF THE INVENTION

1. Field of the Invention

The present invention relates to a projection type picture display apparatus in which pictures output from a projection unit are projecting to a back face of a screen to thereby display the pictures.

2. Description of the Related Art

Figure 7:
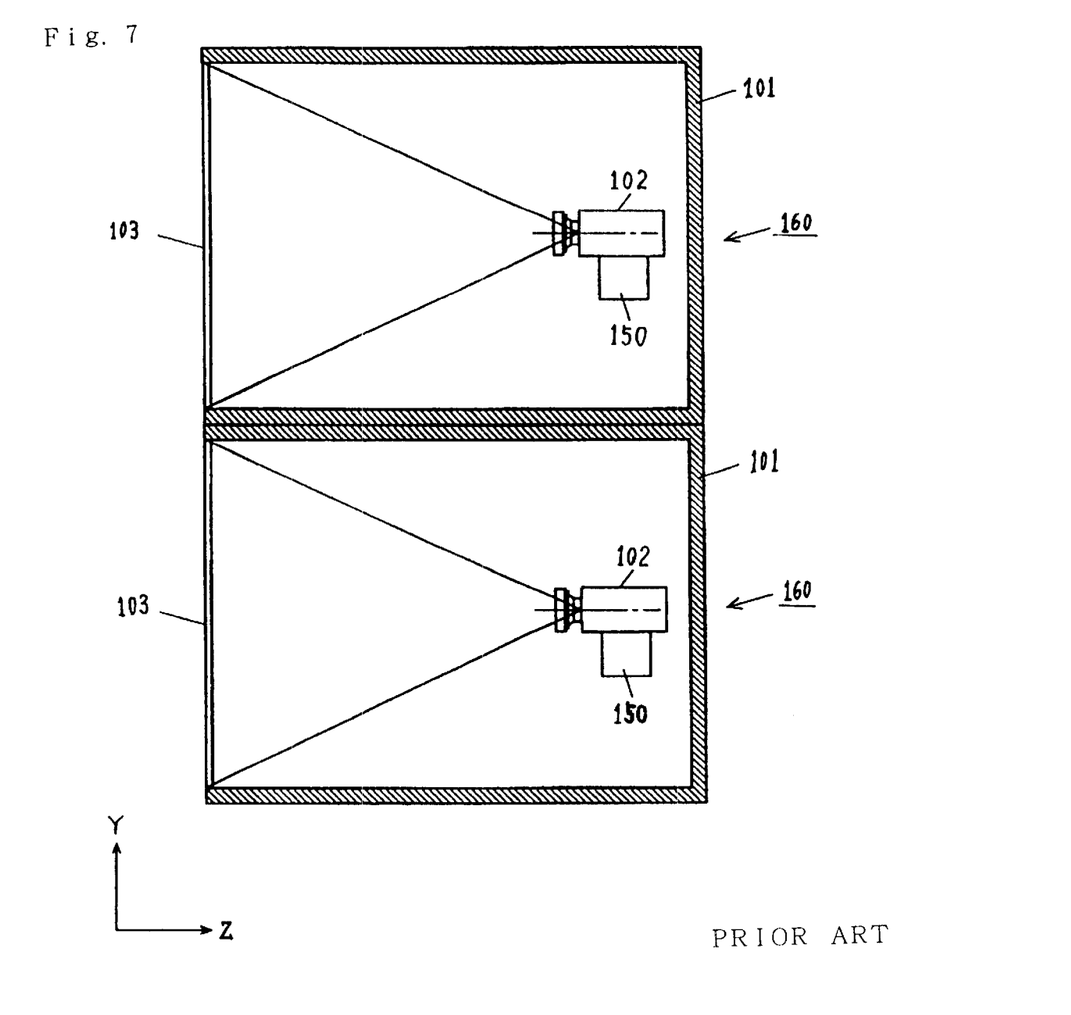
FIG. 7 is a diagram showing a projection type picture display apparatus based on a prior art.

The prior art is shown FIGS. 7–11. In FIGS. 7–11, "X", "Y" and "Z" show the Z-axis, Y-axis and Z-axis of the three dimension space. FIG. 7 is a side view showing the inside of a conventional multi-projector. Here, the multi-projector described above means a display apparatus which is designed to display a large display frame (picture) by arranging and stacking plural projection type picture display apparatuses (rear projection type video projectors) vertically and horizontally. In FIG. 7, it is illustrated that two conventional projection type picture display apparatuses 160 are stacked in the vertical direction.

As shown in FIG. 7, the projection type picture display apparatus comprises a cabinet (the housing of the projection type picture display apparatus) 101, a projection unit 102 which is disposed at the rear side in the cabinet 101 and projects an output picture to the front side, a screen 103 provided at the front face of the cabinet 101, and a position adjusting mechanism 150 for correcting a position of a outline of a picture to be projected from the projection unit 102 to the screen 103. The projection unit 102 projects an output picture to a back face of the screen. A large display frame can be displayed by combining and using a plurality of projection type picture display apparatuses 160 each having the above structure. In this case, the projection unit 102 is secured to the upper portion of the position adjusting mechanism 160 so that the position thereof is adjustable.

Figure 8:
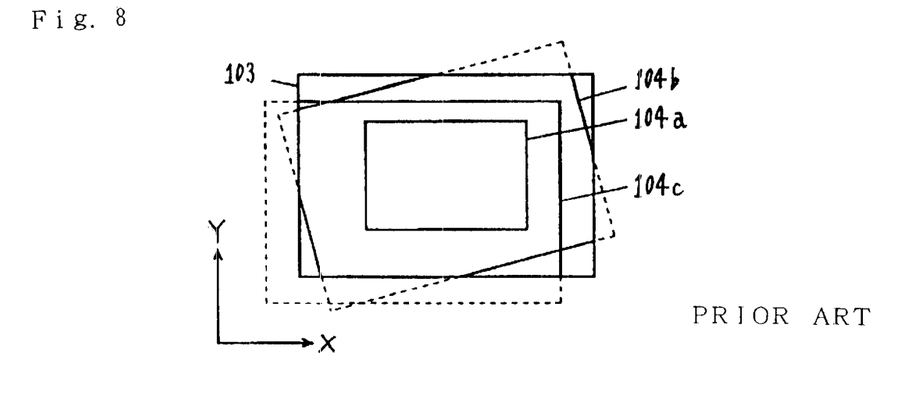
FIG. 8 is a diagram showing the prior art.
Figure 9:
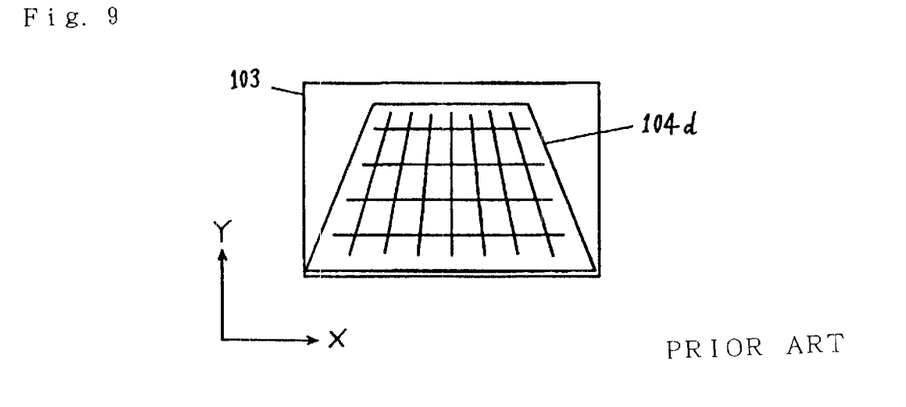
FIG. 9 is a diagram showing the prior art.
Figure 10:
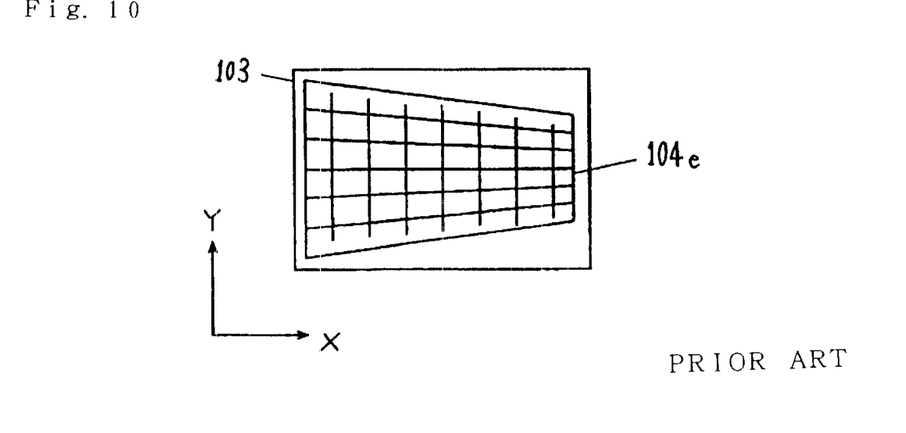
FIG. 10 is a diagram showing the prior art.

FIGS. 8 to 10 are diagrams which conceptually show pictures displayed on the screen 103 while each picture is displaced with respect to the screen 103. As displacements on the screen 103 exist six kinds of displacements which are a vertical displacement (a displacement in the vertical direction), a horizontal displacement (a displacement in the right-and-left direction), an inclining displacement, a projection magnification displacement, a longitudinal trapezoidal distortion and a lateral trapezoidal distortion, or a combination thereof.

In FIG. 8, reference numeral 104a represents a picture which is improper in projection magnification to the screen 103 (magnification-improper picture), reference numeral 104b represents a picture which is improperly inclined with respect to the screen 103 (improperly-inclined picture), and reference numeral 104c represents a picture which is improperly displaced in the vertical and horizontal directions with respect to the screen 103 (vertical/horizontal improper picture).

In FIG. 9, reference numeral 104d represents a picture in which a longitudinal trapezoidal distortion occurs (longitudinal trapezoidal improper picture), and in FIG. 10 reference numeral 104e represents a picture in which a lateral trapezoidal distortion occurs (lateral trapezoidal improper picture).

In most cases, Braun tube (CRT) has been mainly applied to the projection unit 102 because the displacements on the screen 103 of the Braun tube can be easily corrected by an electrical circuit. However, in place of the Braun tube, a liquid crystal device or a digital mirror device for which the optical path cannot be electrically corrected have been recently mainly applied to the projection unit 102 because of the tendency of digitalization of pictures. In this case, a position adjusting mechanism 150 is indispensable for the projection unit 102 for which the optical path cannot be electrically corrected.

Figure 11:
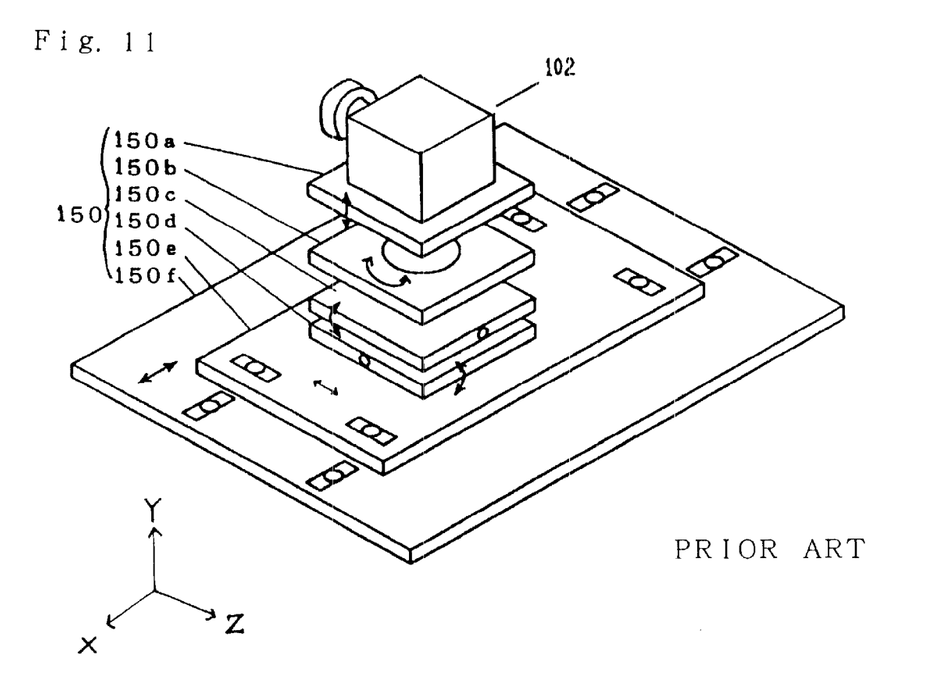
FIG. 11 is a diagram showing a position adjusting mechanism based on the prior art.

FIG. 11 is a perspective view showing the outlook of a conventional position adjusting mechanism 150.

In FIG. 11, reference numeral 150a represents a Y-axis moving plate which can move the projection unit 102 in the Y-axis direction, reference numeral 150b represents an Y-axis rotating plate which is rotatable around the Y-axis, reference numeral 150c represents a Z-axis rotating plate which is rotatable around the Z-axis, reference numeral 150d represents an X-axis rotating plate which is rotatable around the X-axis, reference numeral 150e represents a Z-axis moving plate which is movable in the Z-axis direction, and reference numeral 150f represents an X-axis moving plate which is movable in the X-axis direction.

Next, the position adjusting operation of the conventional picture outlook adjusting mechanism 150 shown in FIG. 11 will be described with reference to FIGS. 7 to 11.

A picture projected from the projection unit 102 is projected onto the screen 103. At this time, the projection magnification of the picture can be corrected by the adjusting operation of the Z-axis moving plate 150e. Further, the lateral trapezoidal distortion can be corrected by the Y-axis rotating plate 150b, and the inclination of the picture can be corrected by the adjustment of the Z-axis rotating plate 150c. The longitudinal trapezoidal distortion can be also corrected by the adjustment of the X-axis rotating plate 150d. Still further, the vertical and horizontal position can be corrected by the adjustment of the X-axis moving plate 150f and the Y-axis moving plate 150d.

Japanese Laid-open Patent Application No. Hei-8-32907 discloses another prior art, and specifically it discloses a technique of separating one display unit (projection type picture display apparatus) into a front side cabinet and a back side cabinet.

As described above, in the conventional projection type picture display apparatuses, six adjusting functions must be adjusted for the position adjusting mechanism 6, and also six adjusting functions must be provided every adjusting mechanism performing only one adjustment. Therefore, the number of parts of the apparatus and the weight of the apparatus are increased, and the cost is also increased.

SUMMARY OF THE INVENTION

Therefore, the present invention has been implemented in view of the above circumstances and has an object to provide a projection type picture display apparatus which can reduce the number of parts and the weight.

In order to attain the above object, according to the present invention, a projection type picture display apparatus comprising a projection unit for projecting a picture to a back face of a screen and a position adjusting mechanism for supporting the projection unit and for giving six adjusting functions including X, Y, Z directional adjustments for moving the projection unit along X-axis, Y-axis, Z-axis of three dimension space respectively, and X, Y, Z rotational adjustments for rotating the projection unit around X-axis, Y-axis, Z-axis respectively, characterized in that said position adjusting mechanism has an adjusting plate member for performing three adjusting functions of said six adjusting functions.

The adjusting plate member performs the three adjusting functions including Z rotational adjustment for rotating the projection unit around Z-axis, X rotational adjustment for rotating the projection unit around X-axis, and Y directional adjustment for moving the projection unit along Y-axis.

Further the adjusting plate member has a first support shaft extending in the Y-axis direction, a second support shaft which is disposed so as to be in parallel to said first support shaft and spaced from said first support shaft at a predetermined interval in the Z-axis direction, a third support shaft which is disposed so as to be in parallel to said first support shaft and spaced from said first support shaft at a predetermined interval in the X-axis direction, a first adjusting shaft which is selectively engageable with both of said first and second support shafts or only said second support shaft through a gear switching operation, a second adjusting shaft which is selectively engageable with both said first and third support shafts or only said first support shaft through a gear switching operation, and an adjusting plate is supported on said first, second and third support shafts for supporting the projection unit.

Also the adjusting plate member performs said Z rotational adjustment when said first adjusting shaft engages with both said first and second support shaft and said second adjusting shaft engages with said first support shaft but no-engages with said third support shaft, said X rotational adjustment when said first adjusting shaft engages with said second support shaft but no-engages with said first support shaft and said second adjusting shaft engages with said first support shaft but no-engages with said third support shaft, and said Y directional adjustment when said first adjusting shaft engages with both said first and second support shaft and said second adjusting shaft engages with both said second and third support shafts.

In the projection type picture display apparatus, one end of said first adjusting shaft has a knurled portion on the outer peripheral portion thereof, and said knurled portion is engaged with a member having a knurled portion on the inner peripheral portion thereof to stop the rotation of said first adjusting shaft.

Further the adjusting plate member has a first support shaft extending in the Y-axis direction, a second support shaft which is disposed so as to be in parallel to said first shaft and spaced from said first support shaft at a predetermined interval in the Z-axis direction, a third support shaft which is disposed so as to be in parallel to said first support shaft and spaced from said first support shaft at a predetermined interval in the X-axis direction, and first, second and third motors for adjusting said first, second and third support shafts respectively, and said adjusting plate member has a adjusting plate is supported on said first, second and third support shaft for supporting the projection unit which is equipped with a projection unit for projecting a picture to a screen and an angle-of-view adjusting mechanism for supporting the projection unit so that the position of the projection unit is adjustable and with which the picture projected from the projection unit is projected from the back of the screen, is characterized in that the angle-of-view adjusting mechanism has an adjusting plate for adjusting three degrees of freedom out of six degrees of freedom of the projection unit.

DETAILED DESCRIPTION OF THE PREFERRED EMBODIMENTS

Preferred embodiments according to the present invention will be described hereunder with reference to the accompanying drawings. In FIGS. 1, 3, 4 and 5, "X", "Y" and "Z" show the X-axis, Y-axis and Z-axis of the three dimension space.

[First Embodiment]

A projection type picture display apparatus according to a first embodiment of the present invention will be described hereunder with reference to the accompanying drawings.

Figure 1:
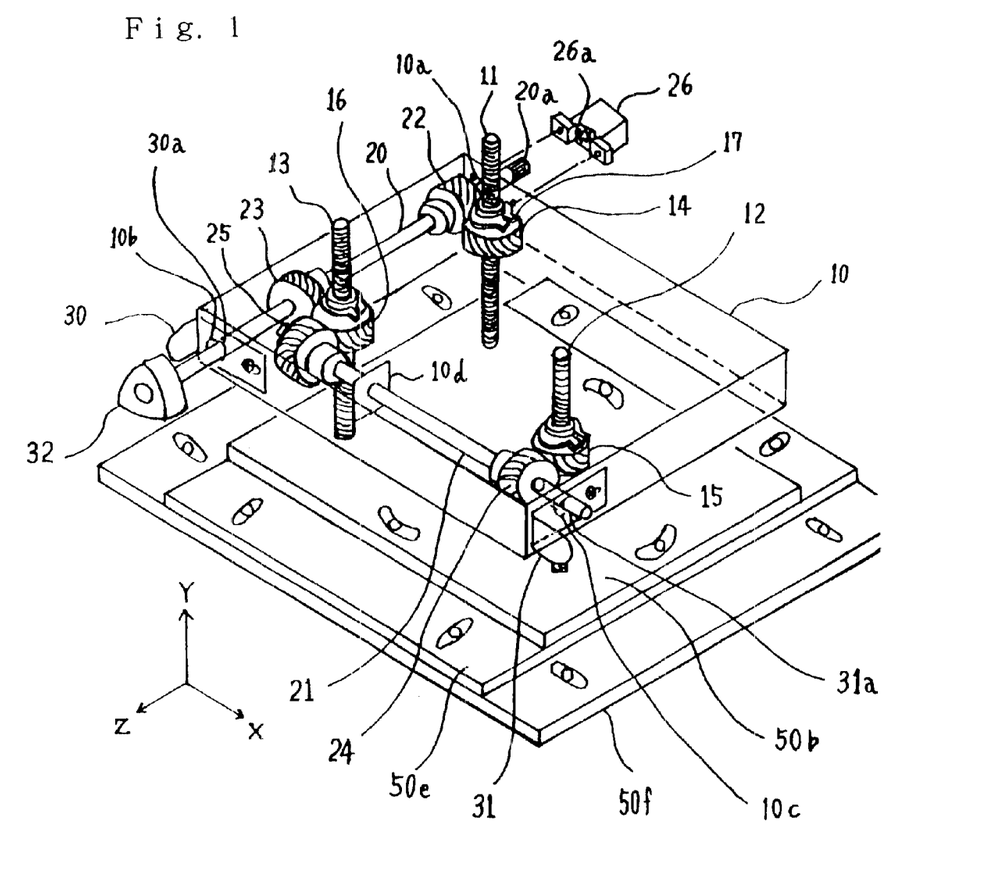
FIG. 1 is a diagram showing a adjusting plate member of a first embodiment of the present invention.

FIG. 1 is a perspective view showing a position adjusting mechanism including a adjusting plate member which is a constituent element of the projection type picture display apparatus. In FIG. 1, reference numeral 10 represents a three-axis adjusting plate (corresponding to an adjusting plate), reference numeral 50f represents an X-axis moving plate, reference numeral 50e represents a Z-axis moving plate and reference numeral 50b represents a Y-axis rotating plate. The X-axis moving plate 50f for X directional adjustment, the Z-axis moving plate 50e for Y directional adjustment and the Y-axis rotating plate 50b for Y rotational adjustment (each of these plates corresponds to one adjusting plate) have the same structure as the conventional ones, and they correspond to the X-axis moving plate 150f, the Z-axis moving plate 150e and the Y-axis rotating plate 150b described in the prior art. On the adjusting plate 10, the projection unit same as prior projection unit 102 is supported.

The three-axis adjusting plate 10 of this embodiment is designed to be supported by gears 14, 15 and 16 in which totally three support bolts 11 (corresponding to a second support shaft), 12 (corresponding to a third support shaft) and 13 (corresponding to a first support shaft) are threaded respectively.

The other parts than the position adjusting mechanism in the projection type picture apparatus are designed in the same structure of the conventional projection type picture apparatus, and thus the description thereof is omitted.

Figure 2:
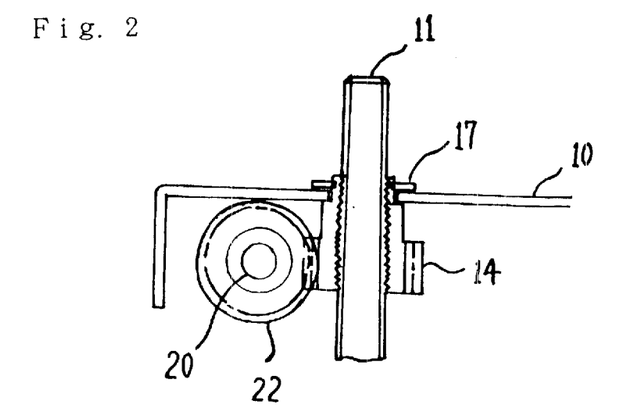
FIG. 2 is a cross-sectional view showing a adjusting plate member of the first embodiment of the present invention.

The three adjusting plate 10 is supported on three bolt 11, 12 and 13. FIG. 2 is a cross-sectional view showing the support portion of one bolt 11 of the three-axis adjusting plate 10. In FIG. 2, the three-axis adjusting plate 10 is freely rotatably supported by a C ring 17 at the boss portion of the gear (spiral gear) 14. The gear 14 is internally threaded on the inner periphery thereof, and the support bolt 11 is threaded in the gear 14. The same construction is applied to the gears 15, 16.

Further, in FIG. 1, the gears 14 and 16 are engaged with the gears 22 and 23 fixed to a shaft 20 (corresponding to the first adjusting shaft), and the gears 14 and 16 are rotated in the same direction by rotating the shaft 20. The gears 15 and 16 are engaged with the gears 24 and 25 fixed to a shaft 21 (corresponding to the second adjusting shaft).

One end of the shaft 20 is rotatably supported through a hole 10a of the three-axis adjusting plate 10, and the other end thereof penetrates through an elongated hole 10b provided in the three-axis adjusting, plate 10 and then is pivotally supported through a hole 30a of a switching lever. A knob 32 is secured to the tip of the other end of the three-axis adjusting plate 10. Further, one end of the shaft 21 is rotatably supported by a bearing 10d provided to the three-axis adjusting plate 10, and the other end thereof penetrates through an elongated hole 10c of the three-axis adjusting plate and then is rotatably supported through a hole 31a of a switching lever 31.

Figure 3:
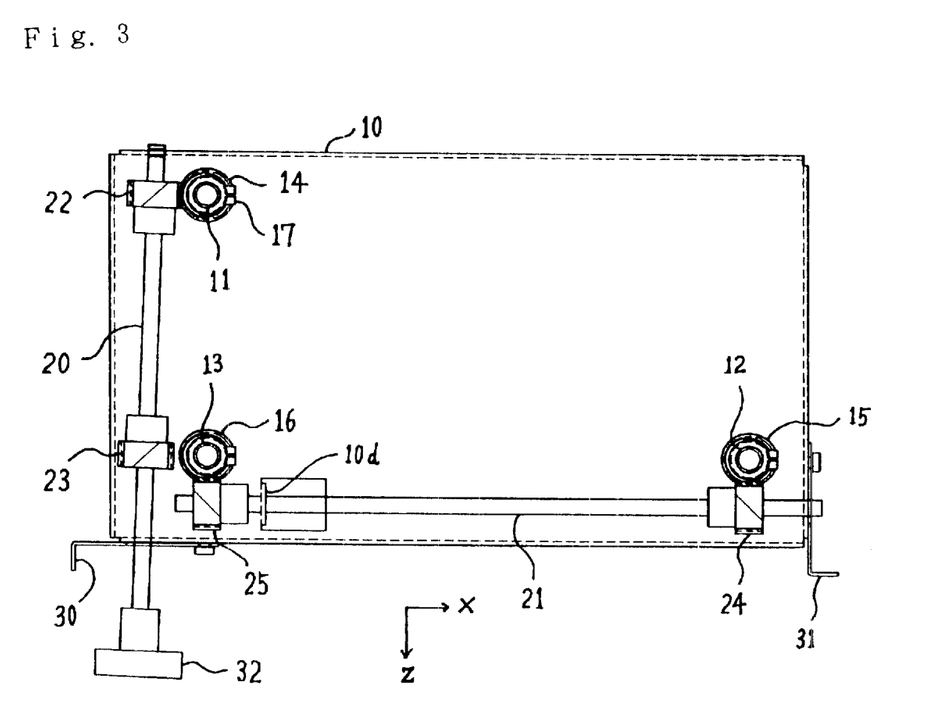
FIG. 3 is a plan view showing a gear switching operation of the first embodiment of the present invention.

By moving the switching lever 30 in the "−X axis direction" (this moving state is referred to as "OFF state", and the moving state in the opposite direction ("+X axis direction") is referred to as "ON state") as shown in FIG. 3, the gear 23 is separated from the gear 16 or no-engages with the gear 16, and the gear 14 is kept engaged with the gear 22.

Figure 4:
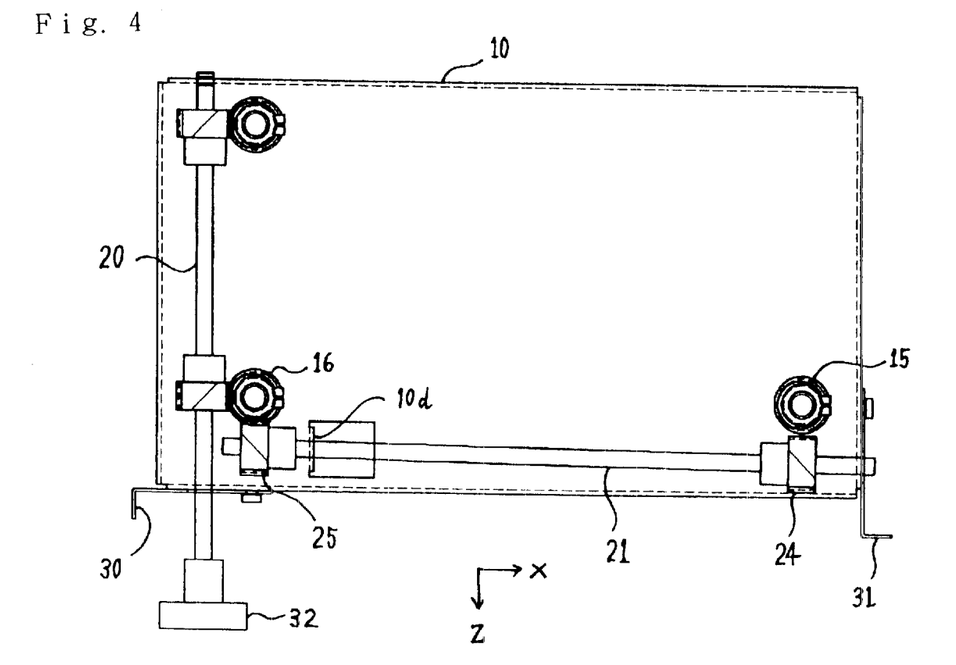
FIG. 4 is a plan view showing the gear switching operation of the first embodiment of the present invention.

Further, as shown in FIG. 4, by moving the switching lever 31 in the "+Z axis direction" (this moving state is referred to as "OFF state", and the moving state in the opposite direction ("−Z axis direction") is referred to as "ON state"), the gear 15 is separated from the gear 24 or no-engages with the gear 24, and only the gear 16 is kept engaged with only the gear 25.

Next, the operation will be described.

When the shaft 20 is rotated in the three-axis adjusting plate 10 while the switching levers 30 and 31 are kept in the ON state, the gears (spiral gears) 14, 15 and 16 are rotated in the same direction, and the three-axis adjusting plate 10 makes a translating motion in the Y-axis direction along the support bolts 11, 12 and 13. The adjustment function is the Y directional adjustment. Further, when the shaft 20 is rotated under the state that the switching lever 30 is set to the ON state and the switching lever 31 is set to the OFF state, the gears 14 and 16 are rotated, however, the gear 15 is not rotated, so that the three-axis adjusting plate 10 makes a rotational motion around the Z-axis with the gear 15 serving as a fulcrum. This adjustment function is the Z rotational adjustment. Further, when the shaft 20 is rotated under the state that the switching lever 30 is set to the OFF state, only the gear 14 is rotated and thus the three-axis adjusting plate 10 makes a rotational motion around the X-axis with the line connecting the gears 12 and 13 serving as an axis. This adjustment function is the X rotational adjustment.

As described above, the three-axis adjusting plate 10 has X-axis rotating, Z-axis rotating and Y-axis moving functions.

Figure 5:
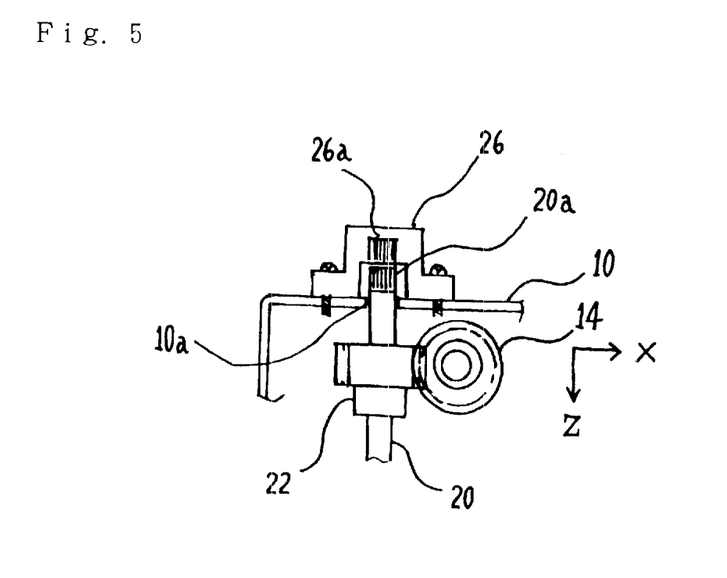
FIG. 5 is a cross-sectional view showing a lock mechanism of the first embodiment of the present invention.

FIG. 5 is a cross-sectional view showing a lock mechanism for stopping the rotation of the adjusting shaft after adjustments of six degrees of freedom are carried out. As shown in FIG. 5, a knurled portion 20a is formed on the outer periphery of one end of the shaft 20 so as to project outwardly from the opening portion 10a formed in the frame of the three-axis adjusting plate 10. When the shaft 20 is pushed in the −Z axis direction, the shaft 20 is engaged with a cap 26 (secured from the outside of the frame of the three-axis adjusting plate 10) having a knurled portion 26a formed on the inner periphery thereof, the knurled portion 26a being engaged with the knurled portion 20a of the shaft 20, whereby the rotation of the shaft 20 is stopped.

The projection type picture display apparatus of the presents invention has the three-axis adjusting plate constituting the position adjusting mechanism, and thus it can adjust three degrees of freedom out of six degrees of freedom by using one adjusting plate. Therefore, the number of parts constituting the display apparatus can be reduced with sufficiently keeping the precision of the position adjustment, so that the weight of the display apparatus and the cost thereof can be reduced.

Further, only one cap 26 which is required as a stopper for rotation of the adjusting shaft and only one operating knob 32 secured to the end portion of the shaft are sufficient for the three-axis adjusting plate 10. In addition, the stopping operation of the rotation after the adjustment of the six degrees of freedom can be easily performed by merely pushing the knob 32 when the knurled portion 20a of the shaft 20 is engaged with the knurled portion 26a of the cap 26.

In the above embodiments, totally three support bolts are provided. However, the above embodiment may be modified so that support bolts are arranged at four corners of the adjusting plate and the engagement states thereof are adjusted by the switching levers in the same manner as the case where the three support bolts are arranged. In this case, the adjustment of three degrees of freedom can be also adjusted by using one adjusting plate.

[Second Embodiment]

Next, a second embodiment of the present invention will be described with reference to FIG. 6.

Figure 6:
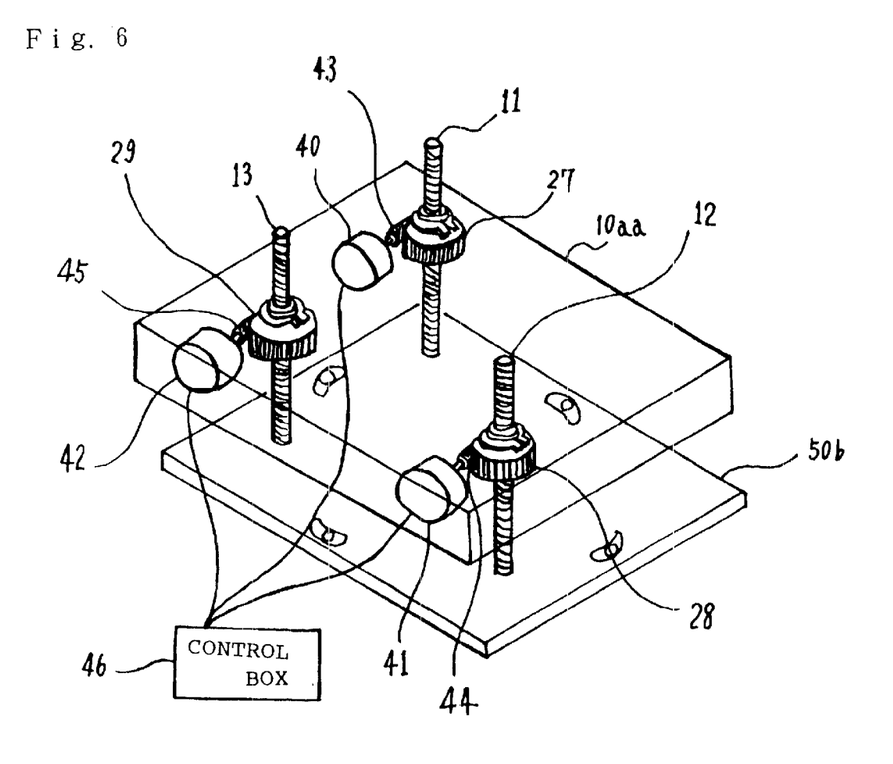
FIG. 6 is a diagram showing a adjusting plate member of a second embodiment of the present invention.

FIG. 6 is a perspective view showing a three-axis adjusting plate 10aa (corresponding to the adjusting plate) constituting the angle-of-view adjusting mechanism of the projection type picture display apparatus.

In FIG. 6, reference numerals 27, 28 and 29 represent gears in which support bolts 11, 12 and 13 respectively are threaded, reference numerals 40, 41 and 42 represent motors (the motor 40 corresponds to a second motor), the motor 41 corresponds to a third motor and the motor 42 corresponds to a first motor), and reference numerals 43, 44 and 45 represent gears (worm gears) which are fixed to the rotational shafts and disposed to be engaged with the gears 27, 28 and 29, respectively. Reference numeral 46 represents a control box for controlling the motors 40, 41 and 42. The same elements as or corresponding elements to those of the first embodiment are represented by the same reference numerals.

As in the case of the three-axis adjusting plate 10 of the first embodiment, the bolts 11, 12 and 13 are threaded in the gears 27, 28 and 29 in the three-axis adjusting plate 10aa of the second embodiment. The coupling structure of the three-axis adjusting plate 10aa and the gears 27, 28 and 29 is also the same as the first embodiment.

Next, the operation of the second embodiment will be described.

When the motors 40, 41 and 42 are rotated in the same direction, the gears 27, 28 and 29 are moved along the support bolts, and the three-axis adjusting plate 10aa makes a translating motion in the Y-axis direction. When only the motor 40 is rotated, the three-axis adjusting plate 10aa makes a rotational motion around the X-axis with the line connecting the gears 28 and 29 serving as an axis. When only the motor 41 is rotated, the three-axis adjusting plate 10aa makes a rotational motion around the Z-axis with the line connecting the gears 27 and 29 serving as an axis. As described above, the three-axis adjusting plate 10aa of the second embodiment has the X-axis rotating, Z-axis rotating and Y-axis translating functions like the first embodiment.

As described above, even when the adjustment of three degrees of freedom out of six degrees of freedom is carried out by using the three motors 40, 41 and 42, the adjustment of three degrees of freedom can be carried out by using one adjusting plate, so that the weight and cost of the display apparatus can be reduced.

In order to simplify the description, the X-axis translating plate 50f and the Z-axis translating plate 50e are omitted from the illustration of FIG. 6.

According to the projection type picture display apparatus of the present invention, three adjusting functions of six adjusting functions degrees can be performed by using one adjusting plate member, and the number of parts constituting the display apparatus can be reduced with sufficiently keeping the precision of the position adjustment, so that the weight and cost of the display apparatus can be reduced.

Further, according to the projection type picture display apparatus, the stop of the rotation of the adjusting shaft can be carried out by a simple operation of engaging the knurled portion formed at the end portion of the adjusting shaft with the knurled portion fixed to the adjusting plate, and thus stable projection can be performed.

Still further, according to the projection type picture display apparatus, even when the first, second and third support shafts provided to the adjusting plate are adjusted by the first, second and third motors, three adjusting functions of six adjusting functions can be performed by one adjusting plate, and the number of parts constituting the display apparatus can be reduced with sufficiently keeping the precision of the position adjustment, so that the weight and cost of the display apparatus can be reduced.

What is claimed is:

1. A projection type picture display apparatus comprising:
    a projection unit for projecting a picture to a back face of a screen and
    a position adjusting mechanism for supporting the projection unit and for giving six adjusting functions including X, Y, Z directional adjustments for moving the projection unit along X-axis, Y-axis, Z-axis of three dimension space respectively, and X, Y, Z rotational adjustments for rotating the projection unit around X-axis, Y-axis, Z-axis respectively,
    wherein said position adjusting mechanism includes an adjusting plate member for performing three adjusting functions of six adjusting functions, and the three adjusting functions include one directional adjustment selected from said X, Y, Z directional adjustments and two rotational adjustments selected from said X, Y, Z rotational adjustments.

2. The projection type picture display apparatus as claimed in claim 1, wherein said adjusting plate member performs the three adjusting functions including Z rotational adjustment for rotating the projection unit around Z-axis, X rotational adjustment for rotating the projection unit around X-axis, and Y directional adjustment for moving the projection unit along Y-axis.

3. The projection type picture display apparatus as claimed in claim 2, wherein said adjusting plate member has a first support shaft extending in the Y-axis direction, a second support shaft which is disposed so as to be in parallel to said first support shaft and spaced from said first support shaft at a predetermined interval in the Z-axis direction, a third support shaft which is disposed so as to be in parallel to said first support shaft and spaced from said first support shaft at a predetermined interval in the X-axis direction, a first adjusting shaft which is selectively engageable with both of said first and second support shafts or only said second support shaft through a gear switching operation, a second adjusting shaft which is selectively engageable with both said first and third support shafts or only said first support shaft through a gear switching operation, and an adjusting plate is supported on said first, second and third support shafts for supporting the projection unit.

4. The projection type picture display apparatus as claimed in claim 3, wherein said adjusting plate member performs said Z rotational adjustment when said first adjusting shaft engages with both said first and second support shaft and said second adjusting shaft engages with said first support shaft but does not engage with said third support shaft, said X rotational adjustment when said first adjusting shaft engages with said second support shaft but does not engage with said first support shaft and said second adjusting shaft engages with said first support shaft but does not engage with said third support shaft, and said Y directional adjustment when said first-adjusting shaft engages with both said first and second support shaft and said second adjusting shaft engages with both said second and third support shafts.

5. The projection type picture display apparatus as claimed in claim 3, wherein one end of said first adjusting shaft has a knurled portion on the outer peripheral portion thereof, and said knurled portion is engaged with a member having a knurled portion on the inner peripheral portion thereof to stop the rotation of said first adjusting shaft.

6. The projection type picture display apparatus as claimed in claim 2, wherein said adjusting plate member has a first support shaft extending in the Y-axis direction, a second support shaft which is disposed so as to be in parallel to said first shaft and spaced from said first support shaft at a predetermined interval in the Z-axis direction, a third support shaft which is disposed so as to be in parallel to said first support shaft and spaced from said first support shaft at a predetermined interval in the X-axis direction, and first, second and third motors for adjusting said first, second and third support shafts respectively, and said adjusting plate member has an adjusting plate which is supported on said first, second and third support shaft for supporting the projection unit.

7. A position adjusting apparatus for supporting and adjusting the position of a projection unit, which projects an image onto a back face of a screen, comprising:
    a position adjusting mechanism for supporting the projection unit and for giving six adjusting functions including X, Y, Z directional adjustments for moving the projection unit along the X-axis, Y-axis, Z-axis of three dimension space respectively, and X, Y, Z rotational adjustments for rotating the projection unit around X-axis, Y-axis, Z-axis respectively,
    wherein said position adjusting mechanism includes an adjusting plate member which performs Z rotational adjustment for rotating the projection unit around the Z-axis, X rotational adjustment for rotating the projection unit around the X-axis and Y directional adjustment for moving the projection unit along the Y-axis.

8. A picture display apparatus, comprising;
    a projection unit for projecting a picture on a screen; an adjustment mechanism for supporting the projection unit and for giving six adjusting functions including X, Y, Z directional adjustments for moving the projection unit along the X-axis, Y-axis, Z-axis of three dimension space respectively, and X, Y, Z rotational adjustments for rotating the projection unit around the X-axis, Y-axis, Z-axis respectively,
    wherein said position adjusting mechanism includes an adjusting plate member which performs Z rotational adjustment for rotating the projection unit around the Z-axis, X rotational adjustment for rotating the projection unit around the X-axis and Y directional adjustment for moving the projection unit along the Y-axis.

* * * * *